(12) United States Patent
Igawa et al.

(10) Patent No.: US 11,573,132 B2
(45) Date of Patent: Feb. 7, 2023

(54) TEMPERATURE SENSOR UNIT AND BODY CORE THERMOMETER

(71) Applicant: Biodata Bank, Inc., Tokyo (JP)

(72) Inventors: Norio Igawa, Yamaguchi (JP); Yuya Kodera, Tokyo (JP); Koichiro Sato, Tokyo (JP); Hiro Ichinokura, Tokyo (JP); Takeshi Anzai, Tokyo (JP)

(73) Assignee: Biodata Bank, Inc., Tokyo (JP)

( * ) Notice: Subject to any disclaimer, the term of this patent is extended or adjusted under 35 U.S.C. 154(b) by 0 days.

(21) Appl. No.: 17/428,768

(22) PCT Filed: Mar. 9, 2020

(86) PCT No.: PCT/JP2020/010006
§ 371 (c)(1),
(2) Date: Aug. 5, 2021

(87) PCT Pub. No.: WO2020/184511
PCT Pub. Date: Sep. 17, 2020

(65) Prior Publication Data
US 2022/0042856 A1 Feb. 10, 2022

(30) Foreign Application Priority Data

Mar. 14, 2019 (JP) .............................. JP2019-047122
Jul. 2, 2019 (JP) .............................. JP2019-123485

(51) Int. Cl.
*G01K 13/20* (2021.01)
*G01K 7/16* (2006.01)
*G01K 3/00* (2006.01)

(52) U.S. Cl.
CPC ............... *G01K 7/16* (2013.01); *G01K 3/005* (2013.01); *G01K 13/20* (2021.01)

(58) Field of Classification Search
CPC ............ A61B 5/01; A61B 2018/00791; A61B 2576/02; G01J 5/0025; G01K 13/20;
(Continued)

(56) References Cited

U.S. PATENT DOCUMENTS 3,933,045 A * 1/1976 Fox ..................... G01K 13/20
374/134
5,178,468 A * 1/1993 Shiokawa ................ G01K 1/18
374/185

(Continued)

FOREIGN PATENT DOCUMENTS

CN 111108353 A * 5/2020 ............. G01K 1/024
CN 111141420 A * 5/2020
(Continued)

OTHER PUBLICATIONS

WIPO, Japanese International Search Authority, International Search Report (with English translation) and Written Opinion dated Jun. 2, 2020, in International Patent Application No. PCT/JP2020/010006, 9 pages.
(Continued)

*Primary Examiner* — Gail Kaplan Verbitsky
(74) *Attorney, Agent, or Firm* — Peter R. Martinez; Masuvalley & Partners

(57) ABSTRACT

To provide a temperature sensor unit and a body core thermometer making it possible to produce in low costs. The temperature sensor unit (1) is used to measure a deep part body temperature Ti as a body core temperature of a testee. The temperature sensor unit (1) comprises at a measurement face side facing a body surface of the testee first-fourth temperature sensors (111-114) for measuring the body surface of the testee. Among the first and the second temperature sensors (111, 112), the first thermal resistor (121) is disposed only at the measurement face side of the first temperature sensor (111). Furthermore, the first temperature
(Continued)

sensor (111) and the second temperature sensors (112) are disposed proximally such that a temperature Ti at the measurement face side of the first thermal resistor (121) becomes approximately equal to a temperature T2 measured by the second temperature sensor (112).

6 Claims, 5 Drawing Sheets

(58) Field of Classification Search
CPC .......... G01K 13/00; G01K 17/06; G01K 1/02; G01K 1/16
See application file for complete search history.

(56) References Cited

U.S. PATENT DOCUMENTS

| | | | | |
|---|---|---|---|---|
| 6,220,750 | B1* | 4/2001 | Palti | G01K 7/02 |
| | | | | 600/475 |
| 6,827,487 | B2* | 12/2004 | Baumbach | G01K 1/165 |
| | | | | 600/323 |
| 8,511,892 | B2* | 8/2013 | Koch | G01K 7/42 |
| | | | | 374/163 |
| 10,830,649 | B2* | 11/2020 | Tsuchimoto | G01K 7/223 |
| 2003/0069714 | A1* | 4/2003 | Wigley | G01K 13/20 |
| | | | | 702/131 |
| 2003/0222218 | A1 | 12/2003 | Nozu | |
| 2006/0209920 | A1* | 9/2006 | Kamiyama | G01K 13/20 |
| | | | | 374/E7.042 |
| 2007/0239038 | A1* | 10/2007 | Nicolaescu | A61B 5/01 |
| | | | | 600/483 |
| 2007/0282218 | A1 | 12/2007 | Yarden | |
| 2010/0268113 | A1* | 10/2010 | Bieberich | A61B 5/6833 |
| | | | | 600/549 |
| 2011/0202055 | A1* | 8/2011 | Selig | A61B 18/1206 |
| | | | | 606/41 |
| 2012/0109572 | A1* | 5/2012 | Shimizu | G01K 7/427 |
| | | | | 702/131 |
| 2014/0343887 | A1* | 11/2014 | Shimizu | G01K 1/165 |
| | | | | 702/131 |
| 2015/0164422 | A1* | 6/2015 | Lee | A61B 5/02055 |
| | | | | 600/301 |
| 2015/0313474 | A1* | 11/2015 | Goto | A61B 5/7235 |
| | | | | 600/549 |
| 2016/0081629 | A1* | 3/2016 | Rostalski | A61B 5/6801 |
| | | | | 600/549 |
| 2018/0184903 | A1* | 7/2018 | Wood | A61B 5/0008 |
| 2018/0242850 | A1* | 8/2018 | Ellis | G16H 40/67 |
| 2019/0049317 | A1* | 2/2019 | Tsuchimoto | G01K 7/223 |
| 2020/0163622 | A1* | 5/2020 | Geva | A61B 5/7221 |
| 2021/0199514 | A1* | 7/2021 | Shimuta | A61B 5/6832 |
| 2021/0275030 | A1* | 9/2021 | Ghoreyshi | G01K 13/20 |
| 2022/0170800 | A1* | 6/2022 | Matsunaga | A61B 5/01 |
| 2022/0260431 | A1* | 8/2022 | Matsunaga | G01K 7/22 |

FOREIGN PATENT DOCUMENTS

| | | | | |
|---|---|---|---|---|
| CN | 111867456 | A * | 10/2020 | ............ A61B 5/01 |
| CN | 113188683 | A * | 7/2021 | ............ G16H 40/67 |
| EP | 03296708 | A1 | 3/2018 | |
| EP | 3431946 | A1 | 1/2019 | |
| JP | 2003-344156 | A | 12/2003 | |
| JP | 2007-212407 | A | 8/2007 | |
| JP | 2013-044624 | A | 3/2013 | |
| JP | WO2013121762 | A1 * | 5/2015 | |
| JP | 2015-111048 | A | 6/2015 | |
| JP | 2016-109518 | A | 6/2016 | |
| JP | 2017-158802 | A | 9/2017 | |
| JP | 2017-217224 | A | 12/2017 | |

OTHER PUBLICATIONS

Korean Office Action dated Sep. 10, 2021 in KR 10-2021-7016383 (8 pages).
Chinese Office Action dated Jan. 10, 2022 in CN 202080007497.3, 5 pages.
Chinese Search Report in CN 202080007497.3, 2 pages.

* cited by examiner

TEMPERATURE SENSOR UNIT AND BODY CORE THERMOMETER

RELATED APPLICATIONS

This application is the U.S. National Phase of and claims priority to International Patent Application No. PCT/JP2020/010006, International Filing Date Mar. 9, 2020; which claims benefit of Japanese Patent Application No. 2019-047122 filed Mar. 14, 2019, and Japanese Patent Application No. 2019-123485 filed Jul. 2, 2019; all of which are incorporated herein by reference in their entireties.

TECHNICAL FIELD

The present invention relates to a temperature sensor unit and a body core thermometer, and particularly relates to a temperature sensor unit and a body core thermometer each being capable of producing in low costs.

BACKGROUND ART

As an apparatus for measuring a deep part body temperature a deep part clinical thermometer for measuring the deep body temperature, which uses two heat flux sensors each being attached with a temperature sensor (temperature measuring element) on upper and lower faces of a thermal resistor (thermal insulator material) having a relatively large area, has been known (for example, refer to Patent Literature 1). Now, a description, claims, and the entire drawings of Patent Literature 1 shall be incorporated in the present description as reference.

FIG. 4 (*a*) is a drawing exemplarily illustrating a schematic configuration of a conventional deep part clinical thermometer and FIG. 4 (*b*) is a drawing exemplarily illustrates a thermal equivalent circuit of a conventional deep part clinical thermometer.

As shown in FIG. 4 (*a*), when the deep body temperature is measured using the conventional deep part clinical thermometer 200, a first heat flux sensor 201 and a second heat flux sensor 202 are closely attached to a body surface of a patient.

Here, it is assumed that a thermal resistance value of the first thermal resistor device 221 of the first heat flux sensor 201 is R1; a temperature measured by the first temperature sensor 211 on an upper face of the first resistor device 221 is T1 and a temperature measured by the second temperature sensor 212 on a lower face is T2.

Furthermore, it is assumed that a temperature measured by the second thermal resistor device 222 of the second heat flux sensor 202 is R2 ($\neq$R1), a temperature measured by the third temperature sensor 213 on an upper face of the second resistor device 222 is T3, and a temperature measured by the fourth temperature sensor 214 on a lower face is T4. Now, when it is assumed that a thermal resistance value of a subcutaneous tissues 230 of a testee is Rz and a deep body temperature is Ti, a deep part clinical thermometer 200 is represented by a thermal equivalent circuit shown in FIG. 4 (*b*).

After the temperature T1 of the upper face and the temperature T2 of the lower face of the first thermal resistor device 221 become stable, the heat amount (heat flux) passing the first thermal resistor device 221 per unit time and the heat flux from the subcutaneous tissues 230 of the testee to the lower face of the first resistor device 221 become equal. In addition, after the temperature T3 of the upper face and the temperature T4 of the lower face of the second thermal resistor device 222 become stable, the heat flux of the second thermal resistor device 222 and the heat flux from the subcutaneous tissues 230 of the testee to the lower face of the second resistor device 222 become equal. Thus, the following equation (9) for the first heat flux sensor 201 and the following equation (10) for the second heat flux sensor 202 become established, respectively.

$$(Ti-T2)/Rz=(T2-T1)/R1$$

$$(Ti-T4)/Rz=(T4-T3)/R2$$

If the thermal resistance value R1 of the first thermal resistor device 221 and the thermal resistance value R2 of the second thermal resistor device 222 are already known values, unknown values in the above equations (9) and (10) are only the thermal resistance value Rz of the subcutaneous tissues 230 and the deep body temperature Ti. Thus, by solving simultaneous equations of the thermal resistance value Rz of the subcutaneous tissues 230 and the deep body temperature Ti and then by erasing the thermal resistance value Rz of the subcutaneous tissues 230 having differences depending on positions and individual differences, the deep body temperature Ti can be measured (calculated) relatively and accurately.

PRIOR ART LITERATURE

Patent Literature: Japanese Patent (Laid-open) No. 2007-212407.

SUMMARY OF INVENTION

Problem to be Solved by Invention

However, there is a problem that the conventional deep part clinical thermometer has required production having a sandwich structure in which the heat flux sensor is sandwiched by two temperature sensors so that production costs become expensive.

The present invention has been completed to solve the above problem, and the present invention aims to provide a temperature sensor unit and a body core thermometer which are able to produce in low costs.

Means for Solving Problem

For achieving the above object, the temperature sensor unit (1) of a first aspect of the present invention is used for measuring a body core temperature of an object to be measured, and comprises at a measurement face side facing a body surface of the object to be measured a plurality of temperature sensors (111-114) for measuring a temperature of the body surface of the object to be measured,
wherein a first thermal resistor (121) is disposed only at the measurement face side of the first temperature sensor (111) among first and second temperature sensors (111, 112) included in the plurality of temperature sensors (111-114), and
wherein the first temperature sensor (111) and the second temperature sensors (112) are disposed proximally such that a temperature at the measurement face side of the first thermal resistor (121) becomes approximately equal to a temperature measured by the second temperature sensor (112).

In the above temperature sensor unit (1), it is preferred that the first thermal resistor (121) is formed by adhering an insulator member (13) at the measurement face side of the first temperature sensor (111).

In the above temperature sensor unit (1), the temperature sensor unit may be one that a second thermal resister (122) is disposed only to a measurement face side of the third temperature sensor (113) among third and fourth temperature sensors (113, 114) included in the plurality of temperature sensors (111-114), and wherein the third temperature sensor (113) and the fourth temperature sensor (114) are disposed proximally such that a temperature of the measurement face side of the second thermal resistor (122) becomes approximately equal to a temperature measured by the fourth temperature sensor (114), and the second thermal resistor (122) is formed by adhering the thermal insulator member (12, 13) to the measurement face side of the third temperature sensor (113) in an appearance different from the first thermal resistor (121) for providing a thermal resistance value different from the first thermal resistor (121).

In the above temperature sensor unit (1), it is preferred that the first temperature sensor (111) and the third temperature sensor (113) are disposed distally from the first temperature sensor (111) and the second temperature sensor (112) and are also disposed distally from the third temperature sensor (113) and the fourth temperature sensor (114).

In the above temperature sensor unit (1), it is preferred that the measurement face sides of the plurality of temperature sensors (111-114) are covered with a thermal conductive material (14).

The temperature sensor unit (1001) in a second aspect of the present invention is used for measuring a body core temperature of an object to be measured and and comprising at a measurement face side facing a body surface of the object to be measured a plurality of temperature sensors (111-114) for measuring a temperature of the body surface of the object to be measured, wherein a conductive pattern (151) is formed at the measurement face side such that one end is connected to the first temperature sensor (111) among the first and the second temperature sensors (111, 112) included in the plurality of temperature sensor (11-114) and the other end is disposed proximally such that the temperature of the other end and the temperature measured by the second temperature sensor (112) become approximately equal.

In the above temperature sensor unit (1001), it is preferred that the second temperature sensor (112) and the other end of the conductive pattern (151) are covered with a thermal conductive material (1014) at the measurement face side.

A body core thermometer (100) of a third aspect of the present invention comprises a plurality of temperature sensors (111-114) disposed at a measurement face side facing a body surface of an object to be measured for measuring a temperature of the body surface of the object to be measured; and a body core temperature measurement part (4), based on the temperature measured with the plurality of temperature sensors (111-114), measuring the body core temperature of the object to be measured; wherein a first thermal resistor (121) is disposed only at the measurement face side of the first temperature sensor (111) among first and second temperature sensors (111, 112) included in the plurality of temperature sensors (111-114), and wherein the first temperature sensor (111) and the second temperature sensors (112) are disposed proximally such that a temperature at the measurement face side of the first thermal resistor (121) becomes approximately equal to a temperature measured by the second temperature sensor (112).

In the above body core thermometer (100), it is preferred that an alerting part (4) for issuing a predetermined alert is disposed in a case where the body core temperature of the object to be measured satisfies a given condition.

Advantageous Effect of Invention

According to the present invention, a temperature sensor unit and a body core thermometer making it possible to produce in low costs can be provided.

MODE FOR PRACTICING INVENTION

Hereafter, embodiments for practicing the present invention will be described.

First, a configuration of a deep part clinical thermometer (body core thermometer) relating to the embodiments of the present invention will be described with reference to drawings.

The deep part clinical thermometer of the present invention is one that is placed on a body surface of central parts such as a head or a body trunk of a testee as an object to be measured and obtains a heat flux from deep parts such as a brain or organisms and the like to measure a body core temperature that is a body temperature in deep parts. Here, the measurement of the body core temperature according to the present invention includes not only the measurement of the body core temperature per se but also an estimation of the body core temperature or a detection of a change in the body core temperature.

Figure 1:
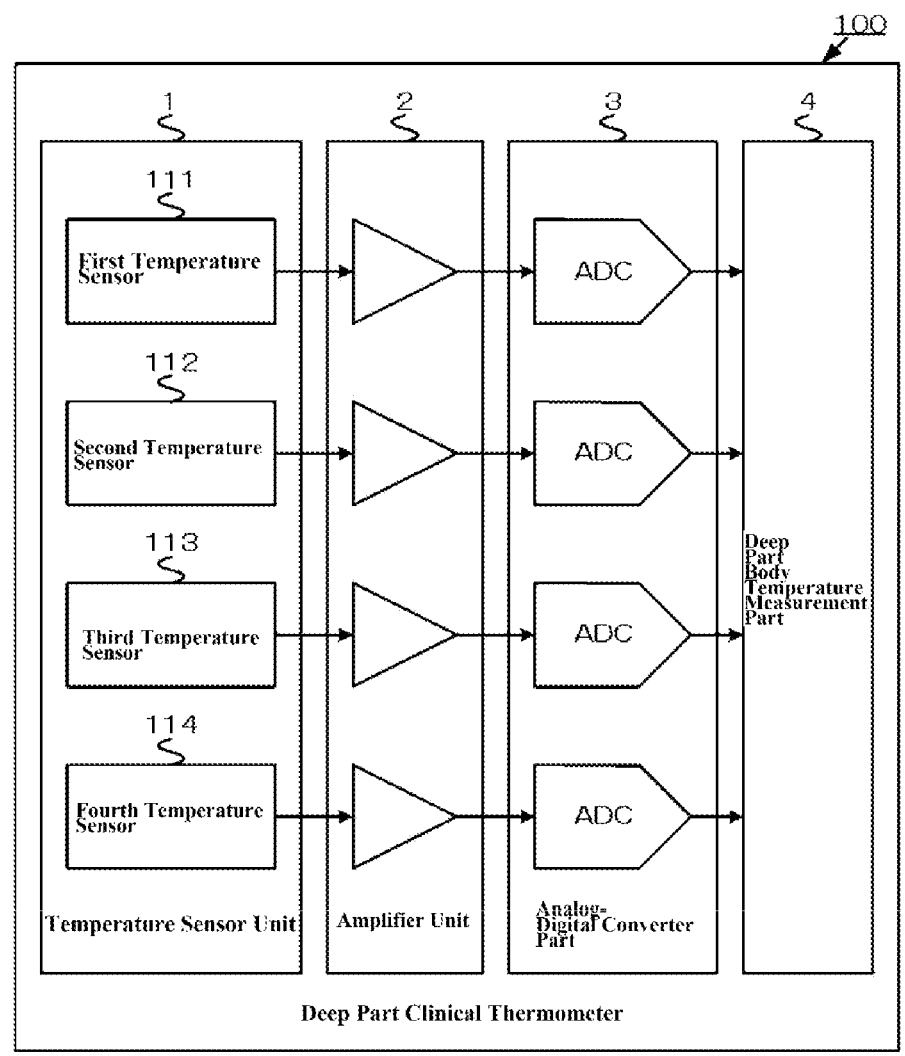
FIG. 1 A block diagram of a whole configuration of a deep part clinical thermometer.

FIG. 1 shows a block diagram of a configuration example of the deep part clinical thermometer.

As shown in FIG. 1, the deep part clinical thermometer 100 includes a temperature sensor unit 1, an amplifier part 2, an analog-digital converter part 3, and a deep part body temperature measurement part (measurement part of the body core temperature) 4.

Figure 2:
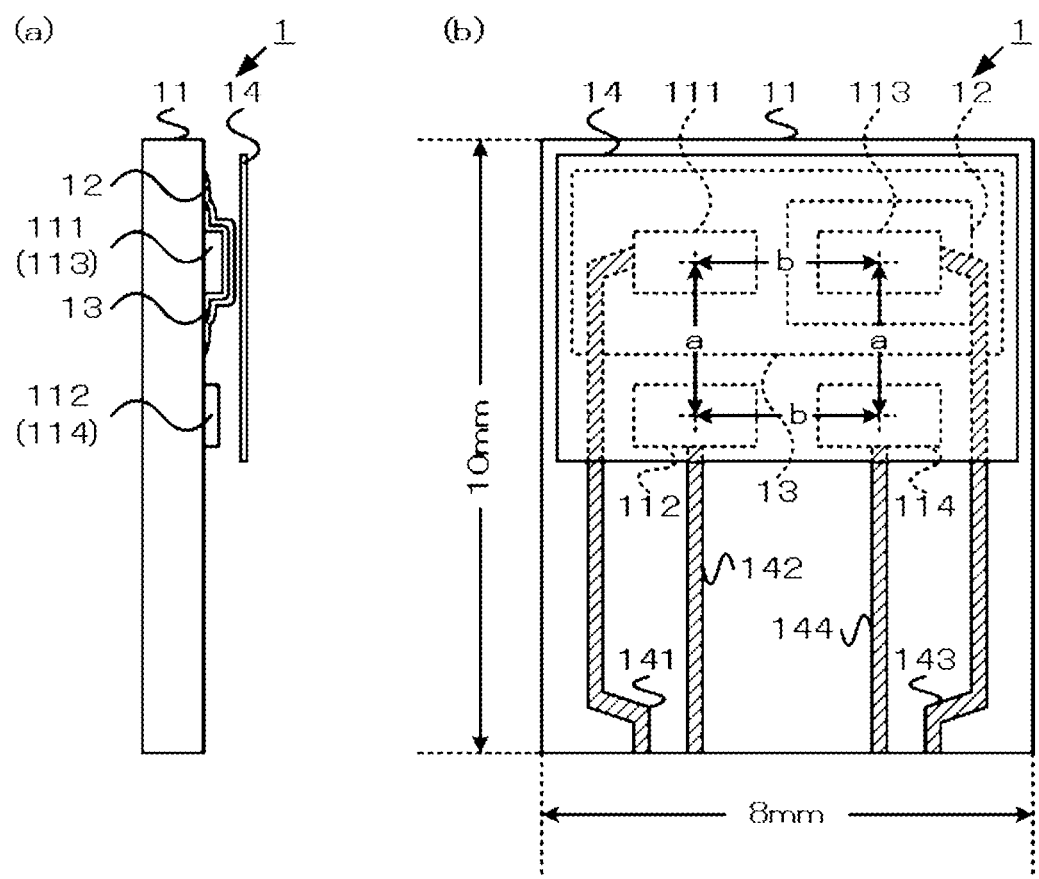
FIG. 2 (a) shows a cross section of a configuration example of the temperature sensor unit and (b) is a drawing illustrating exemplarily a measurement face of the deep body temperature.

FIG. 2 (a) shows a cross section of a configuration example of the temperature sensor unit and FIG. 2 (b) is a drawing illustrating exemplarily a measurement face of the deep part body temperature.

As shown in FIG. 2 (a) and (b), the temperature sensor unit 1 includes, at a measurement surface side for measuring the deep part body temperature while contacting to the body surface of the testee, a substrate 11 implementing four temperature sensors including the first to the fourth 111-114, a first insulator member 12, a second insulator member 13, and a thermal conductive material 14.

The substrate 11 is formed from a material having an electronic insulation performance and a thermal insulation performance such as, for example, polyimide and the like, and in the present embodiment, is a flexible substrate (film substrate) formed to a plane plate having 8 mm×10 mm. Now, the substrate 11 is not limited to the deformable flexible substrate and may be a printed circuit that can not be deformed.

The first and the second insulation members 12 and 13 are ones that function as thermal resistor devices having given thermal resistance value and may be configured by a material having insulation property such as, for example, polyimide and the like. In the present embodiment, the first and the second insulation members 12 and 13 are formed to a thin seal having a thickness to an extent of 0.01 mm for providing flexibility allowing to follow shapes or movements of the body surface of the testee. Now, the shapes of the first and the second insulator members 12 and 13 are not limited to a rectangular shape and may have a circular shape and the like. Furthermore, the material of the first and the second insulator member 12 and 13 is not limited to polyimide and may be an optional material such as, for example, polyethylene foam or urethane foam so far as it has the insulation property. In the present embodiment, the first insulating member 12 is adhered to cover the whole third temperature sensor 113. In addition, the second insulator member 13 is adhered to cover entirely both the first temperature sensor 111 and the third temperature sensor 113 to which the first insulation member 12 is adhered.

A heat conductive material 14 is composed from a metal material, for example, aluminum and the like having higher heat conductivity relative to a testee and is formed to a plane shape or a film shape. The heat conductive material 14 makes it possible that the first-fourth temperature sensors 111-114 measure a body surface temperature of the testee over a resin case. Furthermore, the heat conductive material 14 is disposed to cover entirely the first-fourth temperature sensors 111-114 such that the heat conductive material 14 should make even heat conduction to four first-fourth temperature sensors 111-114 and the like.

The first-fourth temperature sensors 111-114 are ones that measure the body surface temperature of the testee and are configured from thermistors and the like. According to the present embodiment and from the point of view for enhancing responsiveness, it is preferred that the heat capacitance is low as low as possible such that chip thermistors can be used as the first-fourth temperature sensors 111-114. Here, the first-fourth temperature sensors 111-114 may be configured from a Peltier element, a thermo couple, a thermo pile and the like. The first-fourth temperature sensor 111-114 are each connected electrically with the deep body temperature measurement part 4 through first-fourth printed circuits 141-144. The first-fourth temperature sensors 111-114 output electrical signals (voltage values) through the first-fourth printed circuits 141-144, respectively.

As shown in FIG. 2 (b), the a, which is a distance between the first temperature sensor 111 and the second temperature sensor 112 and a distance between the third temperature sensor 113 and the fourth temperature sensor 114, becomes shorter than the b (b>a), which is a distance between the first temperature sensor 111 and the third temperature sensor 113 and also a distance between the second temperature sensor 112 and the fourth temperature sensor 114. That is to say, in the present embodiment, the first temperature sensor 111 is disposed proximally to the second temperature sensor 112 while on the other hand being disposed distally from the third temperature sensor 113. The third temperature sensor 113 is disposed proximally to the fourth temperature sensor 114 while on the other hand being disposed distally from the first temperature sensor 111.

The amplifier part 2 is configured, for example, from four general-purpose amplifiers and the like, and the electric signals input from the first-fourth temperature sensors 111-114 are each output after amplification.

The analog-digital converter part 3 is configured, for example, from four general-purpose A/D (analog-to-digital) converter (ADC) and the like, and the analog signals input from the amplifier part 2 are each output after conversion to digital electric signals.

The deep body part measurement part 4 is configured from, for example, MCU (Micro Control Unit) and the like, and is connected to a speaker or an LED (Light Emitting Diode) and the like. The deep body temperature measurement part 4, based on the temperature indicated by the electric signals input from the analog-digital convertor part 3, measures the deep part body temperature of the testee by obtaining the heat flux from the deep part of the testee. In the present embodiment, the deep body temperature measurement part 4 determines whether the testee has the fear of thermic fever from transitions of the deep body temperature or not. Besides, the deep body part measurement part 4, if given conditions such as where the deep body temperature exceeds a given threshold (critical value) or where the change in the deep body temperature exceeds a given range are satisfied, determines that there is the fear of the thermic fever, and makes the speaker produce beep sound or makes the LED light or blink for alerting the fear of the thermic fever to the testee.

Next, the measurement with the deep part body temperature by the deep part clinical thermometer of the present invention will be described with reference to the drawings.

Figure 3:
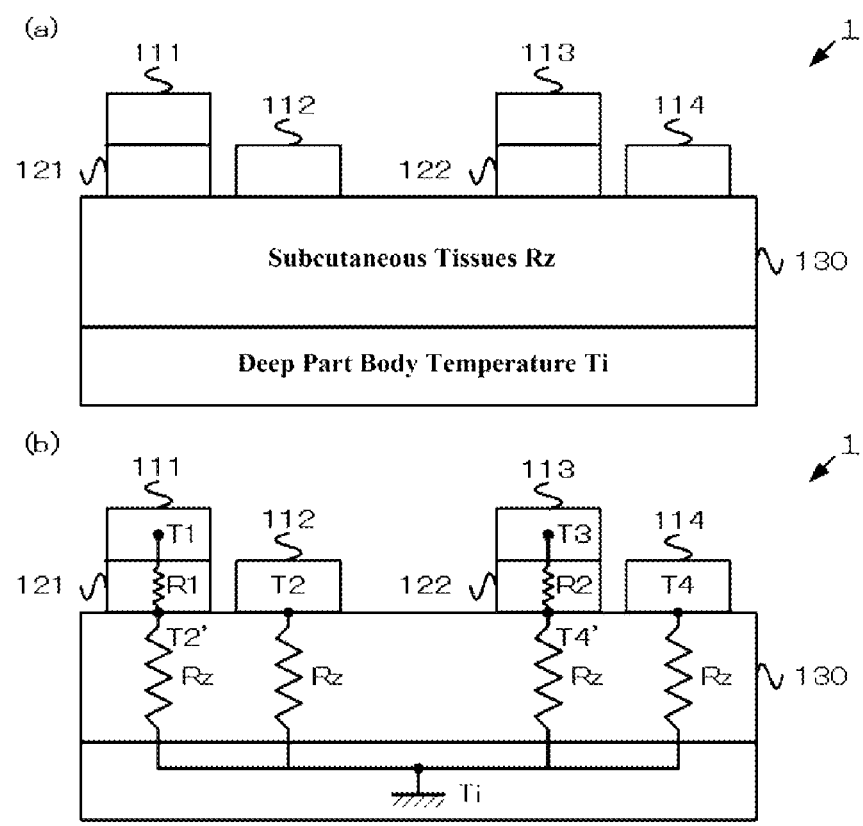
FIG. 3 (a) is a drawing illustrating a schematic configuration of a temperature sensor unit and (b) is a drawing illustrating a thermal equivalent circuit of the temperature sensor unit.
Figure 4:
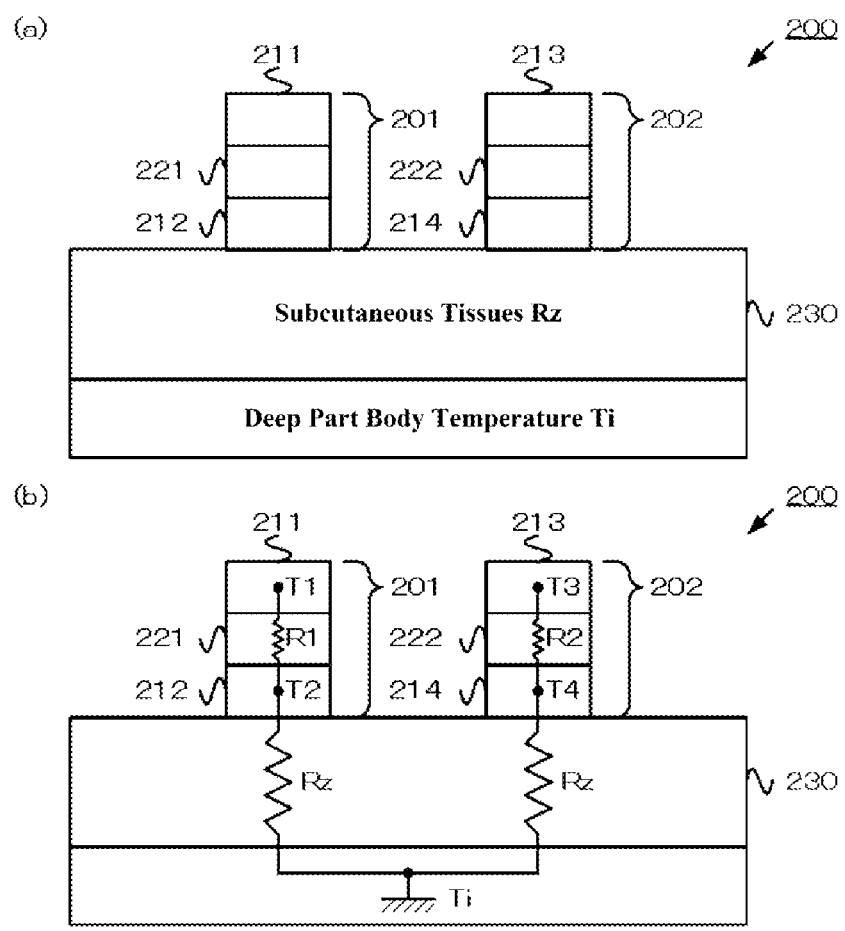
FIG. 4 (a) is a drawing exemplarily illustrating a schematic configuration of a conventional deep part clinical thermometer and (b) is a drawing exemplarily illustrates a thermal equivalent circuit of a conventional deep part clinical thermometer FIG. 5 (a) is a cross sectional view of a configuration example of a temperature sensor unit in an alternative embodiment and (b) is a drawing illustrating exemplarily a measurement face of a deep part body temperature.

FIG. 3 (a) is a drawing illustrating a schematic configuration of a temperature sensor unit and FIG. 3 (b) is a drawing illustrating a thermal equivalent circuit of the temperature sensor unit.

As shown in FIG. 3 (a), when the heat flux is measured by the deep part clinical thermometer, the first-fourth temperature sensors 111-114 are closely contacted to the body surface of the testee through measurement faces.

The second insulator member 13 adhered on the first temperature sensor 111 functions, as shown in FIG. 3 (a), as the first thermal resistor 121 having a given thermal resistance value R1. Furthermore, the first and the second insulator members 12 and 13 adhered on the third temperature sensor 113 function, as shown in FIG. 3 (a), as the second thermal resistor 122 having a thermal resistance value R2 (>R1) larger than the thermal resistance value R1 of the first thermal resistor 121. Now, the thermal resistance value R1 and the thermal resistance value R2 are known values obtained by materials and thicknesses of the first and the second insulator members 12 and 13 and are stored in the deep body temperature measurement part 4 illustrated in FIG. 1.

The first temperature sensor 111 measures a temperature T1 of an upper face of the first thermal resistor 121 and outputs the electric signal indicating the measured temperature T1. The second temperature sensor 112 outputs the electric signals indicating the measured temperature T2. The third temperature sensor 113 measures a temperature T3 of an upper face of the second thermal resistor 122 and outputs the electric signal indicating the measured temperature T3.

The fourth temperature sensor 114 outputs the electric signal indicating the measured temperature T4.

Furthermore, when it is assumed that the thermal resistance value of the subcutaneous tissues 130 of the testee is Rz and the deep body temperature is Ti, the temperature sensor unit 1 shown in FIG. 3 (a) can be represented by a thermal equivalent circuit shown in FIG. 3 (a).

After the temperature T1 of the upper face and the temperature T2' of the lower face of the first thermal resistor 121 become stable, the thermal amount (heat flux) passing through the first thermal resistor 121 per unit time and the heat flux to the lower face of the first thermal resistor 121 from the subcutaneous tissues 130 of the testee become equal. Furthermore, after the temperature T3 of the upper face and the temperature T4' of the lower face of the second thermal resistor 122 become stable, the heat flux of the second thermal resistor 122 and the heat flux to the lower face of the second thermal resistor 122 from the subcutaneous tissues 130 of the testee become equal. Thus, the following equation (1) for the first thermal resistor 121 and the following equation (2) for the second thermal resistor 122 are established, respectively.

$$(T_i-T2')/R_z=(T2'-T1)/R1 \quad (1)$$

$$(T_i-T4')/R_z=(T4'-T3)/R2 \quad (2)$$

As shown in FIG. 3 (b), since the second temperature sensor 112 is not connected in series to the first thermal resistor 121, the heat flux to the lower face of the second temperature sensor (measurement face side) from the subcutaneous tissues 130 of the testee becomes different from the heat flux of the first thermal resistor 121. Furthermore, the fourth temperature sensor 114 is not connected in series to the second thermal resistor 122, the heat flux to the lower face of the fourth temperature sensor (measurement face side) from the subcutaneous tissues 130 of the testee becomes different from the heat flux of the second thermal resistor 122.

Of course, in the present embodiment, the first temperature sensor 111 and the second temperature sensor 112 are disposed proximally, the temperature T2' of the lower face of the first thermal resistor 121 becomes approximately equal to the temperature T2 measured by the second temperature sensor 112. In addition, the third temperature sensor 113 and the fourth temperature sensor 114 are disposed proximally, the temperature T4' of the lower face of the second thermal resistor 122 becomes approximately equal to the temperature T4 measured by the fourth temperature sensor 114. Thus, the following equation (3) for the first thermal resistor 121 and the following equation (4) for the second thermal resistor 122 are established, respectively.

$$T2' \approx T2 \quad (3)$$

$$T4' \approx T4 \quad (4)$$

In addition, when substituting the equation (3) into the equation (1), the following equation (5) is obtained and when substituting the equation (4) into the equation (2), the following equation (6) is obtained, respectively.

$$(T_i-T2)/R_z=(T2-T1)/R1 \quad (5)$$

$$(T_i-T4)/R_z=(T4-T3)/R2 \quad (6)$$

Here, the equation (5) becomes equal to the equation (9) established with respect to the first heat flux sensor 201 of the conventional deep part clinical thermometer 200 and the equation (6) becomes equal to the equation (10) established with respect to the second heat flux sensor 202, respectively.

That is to say, the first temperature sensor 111, the second temperature sensor 112, and the first thermal resistor 121 can provide the function approximately identical with the first heat flux sensor 201 in the sandwich structure of the conventional deep part clinical thermometer 200. Furthermore, the third temperature sensor 113, the fourth temperature sensor 114, and the second thermal resistor 122 can provide the function approximately identical with the second heat flux sensor 202 in the sandwich structure.

Now, for providing the function approximately identical with the first heat flux sensor 201, the first temperature sensor 111 may be preferably disposed proximally to the second temperature sensor 112 and may be preferably disposed distally from the third temperature sensor 113. Similarly, for providing the function approximately identical with the second heat flux sensor 202, the third temperature sensor 113 may be preferably disposed proximally to the fourth temperature sensor 114 and may be preferably disposed distally from the first temperature sensor 111. That is, as exemplarily shown in FIG. 2 (b), the first temperature sensor 111 and the third temperature sensor 113 may be preferably disposed distally from the first temperature sensor 111 and the second temperature sensor 112 and may be preferably disposed distally from the third temperature sensor 113 and the fourth temperature sensor 114.

Since the thermal resistance value R1 of the first thermal resistor 121 and the thermal resistance value R2 of the second thermal resistor 122 are known values, unknown variables in the above equations (5) and (6) are only the thermal resistance value Rz of the subcutaneous tissues 130 and the deep part body temperature Ti. Thus, when the simultaneous equations, in which the thermal resistance value Rz of the subcutaneous tissues 130 and the deep body temperature Ti are each unknown number, are solved to delete the thermal resistance value Rz of the subcutaneous tissues 130 having differences depending on the positions or individual difference from the equations (5) and (6), the following equation (7) is obtained.

[Equation 1]

$$T_i = \frac{R_1 T_2 (T_4 - T_3) - R_2 T_4 (T_2 - T_1)}{R_1 (T_4 - T_3) - R_2 (T_2 - T_1)} \quad (7)$$

Furthermore, when the definition is provided as K=R1/R2, the equation (7) can be simplified as the following equation (8). Here, as described above, since the thermal resistance value R1 and the thermal resistance value R2 are known values, K is also a known value such that K is stored in the deep part body temperature measurement part 4 shown in FIG. 1.

[Equation 2]

$$T_i = \frac{K T_2 (T_4 - T_3) - T_4 (T_2 - T_1)}{K (T_4 - T_3) - (T_2 - T_1)} \quad (8)$$

The deep part body temperature measurement part 4 shown in FIG. 1 can measure (calculate) the deep part body temperature Ti relatively and precisely by substituting the temperatures T1-T4 indicated by the temperature signals input from the first-fourth temperature sensor 111-114 into the equations (7) and (8), respectively.

As described above, the deep part body clinical thermometer (body core thermometer) 100 of the present invention includes the temperature sensor unit 1 and the deep part body temperature measurement part (body core temperature measurement part) 4. The temperature sensor unit 1 is used to measure the deep part body temperature Ti as the body core temperature of the testee. The temperature sensor unit 1 includes the first-fourth temperature sensor 111-114 on the measurement face side facing the body surface of the testee for measuring the body surface temperature the testee. Among the first and the second temperature sensors 111 and 112, the first thermal resistor 121 is disposed only on the measurement face side of the first temperature sensor 111. Furthermore, the first temperature sensor 111 and the second temperature sensor 112 are disposed proximally such that the temperature T2' of the measurement face side of the first temperature sensor 111 becomes approximately equal to the temperature T2 measured by the second temperature sensor 112.

Thereby, the first temperature sensor 111, the second temperature sensor 112, and the first thermal resistor 121 can provide the function approximately identical with the first heat flux sensor 201 of the conventional deep part clinical thermometer 200. As described above, the temperature sensor unit 1, without providing the first heat flux sensor 201 in the sandwich structure with high production costs, can realize the function approximately identical with the first heat flux sensor 201 by the first temperature sensor 111, the second temperature sensor 112, and the first thermal resistor 121, thereby allowing production in lower costs than conventional one.

Furthermore, the first thermal resistor 121 can be formed by a simple approach in which the second insulator member 13 is adhered to the measurement face side of the first temperature sensor 111 such that the production costs can be further reduced.

Besides, among the third and the fourth temperature sensors 113, 114, the second thermal resistor 122 is disposed only at the measurement face side of the third temperature sensor 113. In addition, the third temperature sensor 113 and the fourth temperature sensor 114 are disposed proximally such that the temperature T4' at the measurement face side of the second thermal resistor 122 becomes equal to the temperature T4 measured by the fourth temperature sensor 114. In addition, the second thermal resistor 122 is formed to have the thermal resistance value different from the first resistor 121 by adhering the insulator member on the measurement face side of the third temperature sensor 113 with an appearance different from the first thermal resistor 121, more concretely by adhering and overlaying the first and second insulator members 12 and 13 each other. Thereby, the first and second thermal resistors 121 and 122 having different thermal resistance values can be produced in a simple method so that the production costs can be further reduced.

Furthermore, the first temperature sensor 111 and the third temperature sensor 113 are disposed distally from the first temperature sensor 111 and the second temperature sensor 112 and are also disposed distally from the third temperature sensor 113 and the fourth temperature sensor 114. Thereby, the first temperature sensor 111, the second temperature sensor 112 and the first thermal resistor 121 can suitably provide the function approximately identical with the first heat flux sensor 201. Besides, the third temperature sensor 113, the fourth temperature sensor 114 and the second thermal resistor 122 can suitably provide the function approximately identical with the second heat flux sensor 202.

The first-fourth temperature sensors 111-114 are covered with the thermal conductive material 14 at their measurement face sides. Thereby, the first-fourth temperature sensors 111-114 can measure the temperature of the body surface of the testee over the case made from the resin. Also, even thermal conduction to four first-fourth temperature sensors 111-114 can be attained.

The deep part body temperature measurement part 4, based on the temperatures measured by the first-fourth temperature sensor 111-114, measures the deep body temperature of the testee. Furthermore, the deep part clinical thermometer 100 includes the speaker or the LED for issuing a predetermined alert as the fear for the thermic fever when the deep part body temperature of the testee satisfies a given condition. Thereby, the testee can be prevented from the thermic fever before it happens.

Here, the present invention should not be limited to the above embodiments and there may be various alternations or applications. Hereunder, applicable modified embodiments of the above embodiments will be described.

In the above-described embodiment, the description has been provided with assuming that the object to be measured is the testee, i.e., a human being, but the present invention should not be limited thereto, the testee may be an animal.

In the above-described embodiment, the temperature sensor unit 1 has been described with assuming that the temperature sensor unit 1 measures the deep part body temperature by contacting with the body surface of the testee, but the present invention should not be limited thereto, the present invention may be one that measures the deep part body temperature without contacting with the body surface (with non-contact).

In the above-described embodiment, the deep part clinical thermometer 100 has been described with assuming that the deep part clinical thermometer 100 issues a predetermined alert as the fear for the thermic fever when the deep part body temperature of the testee satisfies a given condition, but the present invention should not be limited thereto, the present invention may be one that issues alerts of the fear for abnormal events on mind and body other than the thermic fever when the deep part body temperature of the testee satisfies a given condition and the abnormal events in mind and body may be optional so far as the deep part body temperature relates to the abnormality, such as, for example, hypothermia, quality of sleep, basal body temperature, immunity, or stress and the like.

In the above-described embodiment, the body core thermometer of the present invention has been described by exemplarily describing the deep part clinical thermometer 100 which is mounted on the body surface at the central part such as the head or the body trunk of the testee as an object of the measurement and measures the deep part body temperature Ti that is the deep core temperature of a brain or organs. However, the body core thermometer of the present invention should not be limited thereto, the present invention may be one that measures (including estimation and the like) body core temperatures other than the deep part temperature Ti by being mounted on other positions other than the body trunk. For example, the body core thermometer of the present invention may be one that measures (including estimation and the like) the body core temperature of peripheral parts by being mounted to peripheral parts locating distally from the body trunk such as an arm or an ankle and the like of the testee.

In this case, the deep part body temperature measurement part 4 can estimate the deep part body temperature Ti from the body core temperature at the peripheral part of the testee.

Particularly, the body core temperatures of the peripheral pats and the deep part body temperatures at the central part of the testee are measured beforehand to obtain correlational relations between them and they may be stored in the deep part body temperature 4. Then, the deep part body temperature measurement part 4 can estimate the deep part body temperature Ti from the body core temperature at the peripheral part of the testee using the correlational relations obtained beforehand. For example, when the correlational relation that the deep part body temperature Ti is 5 Celsius degrees higher than the body core temperature of the peripheral part is obtained and when the body core temperature of the peripheral temperature of the testee is measured to be 32 Celsius degrees, 37 Celsius degrees by adding the constant value of 5 Celsius degrees may be estimated as the deep part body temperature Ti. Then, the deep part body temperature measurement part 4, when the estimated deep part body temperature satisfies a given condition where it exceeds a given threshold and the like, may issue the alerts for the thermic fever to the testee.

In the above embodiment, the description has been provided such that the first thermal resistor 121 is formed by adhering the second insulator member 13 at the measurement face side of the first temperature sensor 111, and the second thermal resistor 122 is formed by overlapping and adhering the first and the second insulator members 12 and 13 at the measurement face side of the third temperature sensor 113. However, the present invention should not be limited thereto, the first and the second thermal resistor 121 and 122 may be realized by patterned wirings formed on a printed circuit (Printed Circuit Board; PCB).

Figure 5:
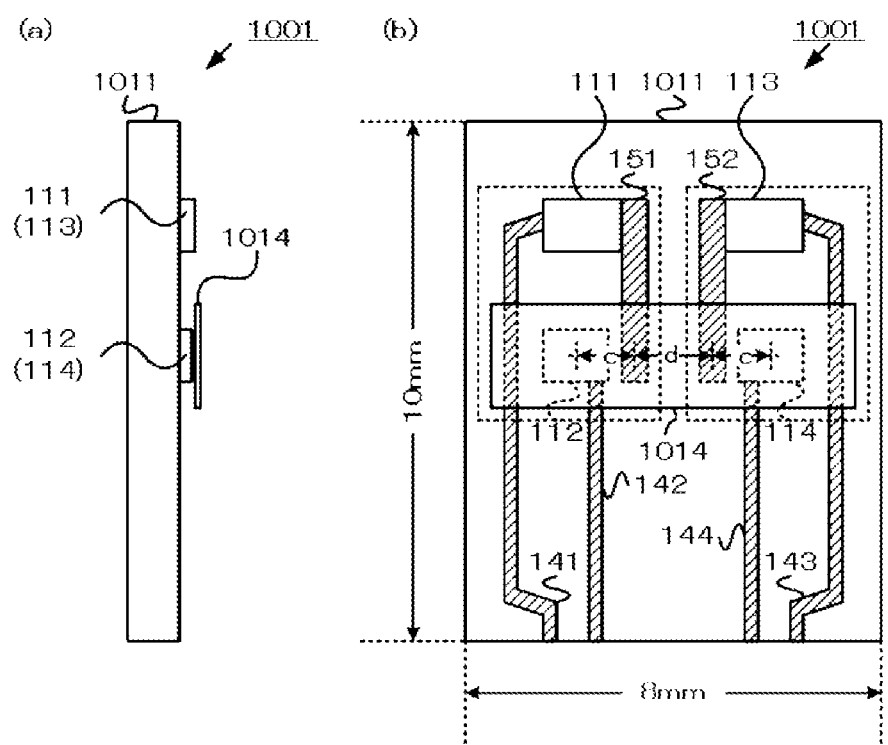

FIG. 5 (a) is a cross sectional view of a configuration example of a temperature sensor unit in an alternative embodiment and (b) is a drawing illustrating exemplarily a measurement face of a deep part body temperature. Now, the same signs are attached to similar configurations to the temperature sensor unit 1 relating to the above embodiment and will omit their explanation.

As shown in FIG. 5 (a) and (b), a temperature sensor unit 1001 of the modified embodiment includes a printed circuit board 1011 implementing four first-fourth temperature sensors 111-114 at the measurement face side for measuring the deep part body temperature with contacting to the body surface of the testee, and a thermal conductive material 1014.

In this modified embodiment, on the printed circuit board 1011, first and second patterned wirings 151 and 152 are formed only for the purpose of thermal conduction. The first and the second patterned wirings 151 and 152 are formed from a thermal conductor such as a cupper sheet and the like having excellent heat conductivity.

The first patterned wiring 151 is connected to the first temperature sensor 111 at its one end (hereafter referred to "connected end"), and on the other hand, the other end (hereafter referred to "non-connected end") is disposed proximally to the fourth temperature sensor 112.

The second patterned wiring 152 is connected to the third temperature sensor 113 at its one end (hereafter referred to "connected end"), and on the other hand, the other end (hereafter referred to "non-connected end") is disposed proximally to the fourth temperature sensor 114.

As shown in FIG. 5 (b), the c, which is a distance between the second temperature sensor 112 and the first patterned wiring 151 and also is a distance between the fourth temperature sensor 114 and the second patterned wiring 152, is shorter than the d (d>c), which is a distance between the patterned wiring 151 and the second wiring 152. That is, in this modified embodiment, the first patterned wiring 151 is disposed proximally to the second temperature sensor 112, and on the other hand, the second patterned wiring 152 is furthermore disposed distally from the fourth temperature sensor 114. The second patterned wiring 152 is disposed proximally to the fourth temperature sensor 114, and on the other hand, the first patterned wiring 151 is furthermore disposed distally from the fourth temperature sensor 112.

In this modified embodiment, the thermal conductive material 1014, for causing the thermal conduction evenly to the second and the fourth temperature sensors 112 and 114 as well as the first and the second temperature sensors 112 and 114, is disposed to cover entirely the second and the fourth temperature sensor s 112 and 114 and to cover the con-connected ends of the first and the second patterned wirings 151 and 152.

In this modified embodiment, the first patterned wiring 151 provides the similar function with the first thermal resistor 121 having the thermal resistance value R1 in the above embodiment. Furthermore, the second patterned wiring 152 provides the similar function with the second resistor having the thermal resistance value R2 (>R1) in the above embodiment. The thermal resistances of the first and the second patterns 151 and 152 are determined by a distance (length) from the thermal conductive material 1014 to the second and the fourth temperature sensor 112 and 114 and thicknesses (width) of the first and the second patterned wirings 151 and 152, respectively. In this modified embodiment, the distance (length) from the thermal conductive material 1014 to the second temperature sensor 114 and the distance (length) from the thermal conductive material 1014 to the fourth temperature sensor 114 are identical, and on the other hand, the thickness (width) of the second patterned wiring 152 is made thinner than the thickness (width) such that the thermal resistance value of the second patter wiring 152 R2 is made larger than the the thermal resistance value R1.

In this alternative embodiment, the non-connected end of the first wiring pattern 151 and the second temperature sensor 112 are positioned proximally so that the temperature T2' at the con-connected end of the first wiring pattern 151 can become approximately equal to the temperature T2 measured by the second temperature sensor 112. Furthermore, the con-connected end of the second wiring pattern 152 and the fourth temperature sensor 114 are positioned proximally so that the temperature T4' at the non-connected end of the first wiring pattern 151 can become approximately equal to the temperature T4 measured by the fourth temperature sensor 114. Therefore, in this modified embodiment, the equations (3) and (4) can be established likely to the above embodiment, respectively. Thus, the first temperature sensor 111, the second temperature sensor 112 and the first wiring pattern 151 can provide the function approximately identical with the first heat flux sensor 201 in the sandwich structure of the conventional deep part body thermometer 200. Furthermore, the third temperature sensor 113, the fourth temperature sensor 114 and the second wiring pattern 152 can provide the function approximately identical with the second heat flux sensor 202 in the sandwich structure.

As described above, to the temperature sensor unit 1001 of this modified embodiment, the first wiring patters 151, which one end is connected to the first temperature sensor 111 and the other end is positioned proximally for making the temperature of the other end approximately equal to the temperature measured by the second temperature sensor 112, is formed at the measurement face side. Furthermore, the other ends of the second temperature sensor 112 and the first wiring pattern 151 are covered with the thermal conductive material 1014.

Thereby, the first temperature sensor 111, the second temperature sensor 112 and the first wiring pattern 151 can provide as the above embodiment the function approximately identical with the first heat flux sensor 201 in the sandwich structure of the conventional deep part body thermometer 200. Furthermore, in the method in which the thermal resistance is formed by adhering the insulator member at the measurement face side of the temperature sensor as the above embodiment, there were problems that the adhesion of the insulator member can not be performed in an automatic process and requires human manual-work such that errors may occur in the thermal resistance values and cost reduction by mass production may not be expected due to human manual-work. As in this modified embodiment, the method that the patterned wirings formed on the printed circuit board are used as the thermal resistor does not requires the human manual-work and also allows the automatic process so that quality stability through the mass production can be improved and cost-down can be attained.

Now, the present invention may have various embodiments and alternatives without departing from wide scope and spirit of the present invention. Furthermore, the above embodiments are for explaining one embodiment of the present invention and should not limit the scope of the present invention.

The present application based on Japanese patent application No. 2019-047122 filed on Mar. 14, 2019 and Japanese patent application No. 2019-123485 filed on Jul. 2, 2019. Descriptions, claims, and drawings of Japanese patent application No. 2019-047122 and Japanese patent application No. 2019-123485 shall be incorporated herein as reference.

DESCRIPTION OF SIGNS 1 temperature sensor unit
2 amplifier part converter
3 analog-digital converter part
4 deep part body temperature measurement part (body core temperature measurement part)
11 substrate
12 first insulation member
13 second insulation member
14 thermal conductive material
100 deep part clinical thermometer (body core thermometer)
111 first temperature sensor
112 second temperature sensor
113 third temperature sensor
114 fourth temperature sensor
121 first thermal resistor
122 second thermal resistor
130 subcutaneous tissues
141 first printed circuit
142 second printed circuit
143 third printed circuit
144 fourth printed circuit
151 first patterned wiring
152 second patterned wiring

The invention claimed is:

1. A temperature sensor unit (1) used for measuring a body core temperature of an object to be measured, comprising at a measurement face side facing a body surface of the object to be measured a plurality of temperature sensors (111-114) for measuring a temperature of the body surface of the object to be measured,
wherein a first thermal resistor (121) is disposed only at the measurement face side of the first temperature sensor (111) among first and second temperature sensors (111, 112) included in the plurality of temperature sensors (111-114),
wherein the first temperature sensor (111) and the second temperature sensors (112) are disposed at a distance of 1.5 mm or less so a temperature at the measurement face side of the first thermal resistor (121) becomes approximately equal to a temperature measured by the second temperature sensor (112),
wherein the first thermal resistor (121) is formed by adhering an insulator member (13) at the measurement face side of the first temperature sensor (111),
wherein a second thermal resistor (122) is disposed only to a measurement face side of a third temperature sensor (113) among third and fourth temperature sensors (113, 114) included in the plurality of temperature sensors (111-114),
wherein the third temperature sensor (113) and the fourth temperature sensor (114) are disposed at a distance of 1.5 mm or less so a temperature of the measurement face side of the second thermal resistor (122) becomes approximately equal to a temperature measured by the fourth temperature sensor (114), and
wherein the second thermal resistor (122) is formed by adhering the thermal insulator member (12, 13) to the measurement face side of the third temperature sensor (113) in an appearance different from the first thermal resistor (121) for providing a thermal resistance value different from the first thermal resistor (121).

2. The temperature sensor unit (1) of claim 1, wherein the first temperature sensor (111) and the third temperature sensor (113) are disposed such that a distance between the first temperature sensor (111) and the third temperature sensor is greater than a distance between the first temperature sensor (111) and the second temperature sensor (112) and a distance between the third temperature sensor (113) and the fourth temperature sensor (114).

3. The temperature sensor unit (1) of claim 1, wherein the measurement face sides of the plurality of temperature sensors (111-114) are covered with a thermal conductive material (14).

4. A temperature sensor unit (1001) used for measuring a body core temperature of an object to be measured and comprising at a measurement face side facing a body surface of the object to be measured a plurality of temperature sensors (111-114) for measuring a temperature of the body surface of the object to be measured,
wherein a conductive pattern (151) is formed at the measurement face side such that one end is connected to the first temperature sensor (111) among the first and the second temperature sensors (111, 112) included in the plurality of temperature sensor (111-114) and the other end is disposed at a distance of 1.5 mm or less so the temperature of the other end and the temperature measured by the second temperature sensor (112) become approximately equal; and
wherein the second temperature sensor (112) and the other end of the conductive pattern (151) are covered with a thermal conductive material (1014) at the measurement face side.

5. A body core thermometer (100) comprising:

a plurality of temperature sensors (111-114) disposed at a measurement face side facing a body surface of an object to be measured for measuring a temperature of the body surface of the object to be measured; and a body core temperature measurement part (4), based on the temperature measured with the plurality of temperature sensors (111-114), measuring the body core temperature of the object to be measured;

wherein a first thermal resistor (121) is disposed only at the measurement face side of the first temperature sensor (111) among first and second temperature sensors (111, 112) included in the plurality of temperature sensors (111-114), wherein the first temperature sensor (111) and the second temperature sensors (112) are disposed at a distance of 1.5 mm or less so a temperature at the measurement face side of the first thermal resistor (121) becomes approximately equal to a temperature measured by the second temperature sensor (112), wherein the first thermal resistor (121) is formed by adhering an insulator member (13) at the measurement face side of the first temperature sensor (111), wherein a second thermal resistor (122) is disposed only to a measurement face side of the third temperature sensor (113) among third and fourth temperature sensors (113, 114) included in the plurality of temperature sensors (111-114), wherein the third temperature sensor (113) and the fourth temperature sensor (114) are disposed at a distance of 1.5 mm or less so a temperature of the measurement face side of the second thermal resistor (122) becomes approximately equal to a temperature measured by the fourth temperature sensor (114), and wherein the second thermal resistor (122) is formed by adhering the thermal insulator member (12, 13) to the measurement face side of the third temperature sensor (113) in an appearance different from the first thermal resistor (121) for providing a thermal resistance value different from the first thermal resistor (121).

6. The body core thermometer (100) of claim 5, wherein an alerting part (4) for issuing a predetermined alert is disposed in a case where the body core temperature of the object to be measured satisfies a given condition.

\* \* \* \* \*